(12) United States Patent
Atkinson (10) Patent No.: US 8,061,395 B1
(45) Date of Patent: Nov. 22, 2011

(54) TRAILER DROP-IN WORK MODULE

(76) Inventor: Dennis W. Atkinson, Conway, SC (US)

( * ) Notice: Subject to any disclaimer, the term of this patent is extended or adjusted under 35 U.S.C. 154(b) by 740 days.

(21) Appl. No.: 11/875,999

(22) Filed: Oct. 22, 2007

(51) Int. Cl.
*B25H 1/12* (2006.01)

(52) U.S. Cl. ...................................................... 144/285

(58) Field of Classification Search ................... 144/129, 144/143, 285, 286.1, 286.5, 28.3, 287; 296/24.32, 296/36, 50, 57.1; 108/11, 13, 34–36, 38, 108/64–66, 68–69, 89–90, 131–132, 135, 108/137, 142–143; 83/471, 477, 477.2, 446, 83/490, 581, 781, 953
See application file for complete search history.

(56) References Cited

U.S. PATENT DOCUMENTS

| | | | | |
|---|---|---|---|---|
| 2,247,314 A * | 6/1941 | Sellmeyer | .................... | 83/471.2 |
| 2,505,658 A * | 4/1950 | Wilson | .......................... | 144/285 |
| 2,674,130 A * | 4/1954 | Spychalla | ........................ | 74/16 |
| 2,816,807 A * | 12/1957 | Bono | ................................ | 312/30 |
| 2,974,693 A * | 3/1961 | Goldschmidt et al. | ........... | 83/426 |
| 3,634,975 A * | 1/1972 | Hensley | ........................ | 451/127 |
| 4,055,206 A | 10/1977 | Griffin | | |
| 4,133,237 A * | 1/1979 | Lewin | .......................... | 83/468.3 |
| 4,150,597 A * | 4/1979 | Striebig | ........................ | 83/471.3 |
| 4,290,657 A * | 9/1981 | Haas | ................................ | 312/21 |
| 4,516,308 A * | 5/1985 | Urban | ............................ | 29/564 |
| 4,827,819 A * | 5/1989 | O'Banion et al. | ........... | 83/471.3 |
| 4,962,685 A * | 10/1990 | Hagstrom | ........................ | 83/397 |
| 5,176,060 A * | 1/1993 | Thornton | ..................... | 83/471.2 |
| 5,329,979 A * | 7/1994 | Miller et al. | .................. | 144/329 |
| 5,383,698 A | 1/1995 | Buchholz | | |
| 5,437,319 A * | 8/1995 | Garuglieri | .................. | 144/286.1 |
| 5,494,089 A * | 2/1996 | Lubbe | ......................... | 144/144.1 |
| 5,577,428 A * | 11/1996 | Rueb | ............................ | 83/449 |
| RE35,666 E * | 11/1997 | Smith | ......................... | 125/13.01 |
| 5,842,400 A * | 12/1998 | McIntosh | ..................... | 83/477.2 |
| 5,863,052 A * | 1/1999 | Roman | ........................... | 280/30 |
| 6,463,837 B2 * | 10/2002 | Andersen et al. | ........... | 83/477.1 |
| 6,546,978 B2 * | 4/2003 | Thoman | ..................... | 144/286.1 |
| 6,565,165 B2 | 5/2003 | Switkes | | |
| 6,701,767 B2 * | 3/2004 | Hartwell et al. | ................ | 72/319 |
| 7,000,658 B1 * | 2/2006 | Soukiassian et al. | .......... | 144/3.1 |
| 7,089,980 B2 * | 8/2006 | Rulli | .......................... | 144/286.1 |
| 7,360,567 B2 * | 4/2008 | Gregoire | ..................... | 144/253.1 |
| 2006/0214446 A1 * | 9/2006 | Johns | .......................... | 296/24.32 |

\* cited by examiner

*Primary Examiner* — David J. Walczak
*Assistant Examiner* — Jennifer C Chiang
(74) *Attorney, Agent, or Firm* — Donald J. Ersler (57) ABSTRACT

Disclosed is a drop-in work module was designed but not limited to be used with a wheeled vehicle such as a trailer. The work module provides a unique method for storing, transporting and having all the tools for task once you arrive to your worksite. The foldable side rails provide an additional feature, which provides additional work space for a jobsite requiring less setup time and the need for extra bench tops. The power equipment is designed to be mounted and ready for use with a minimum amount of setup time required to start your project. The work module depicted is setup for construction type projects but is not limited to various arrangements of tools to provide an optimum work station for various crafts.

19 Claims, 12 Drawing Sheets

TRAILER DROP-IN WORK MODULE

BACKGROUND OF THE INVENTION

1. Field of the Invention

The disclosure made herein generally relates to electric power tools and work benches for power tools and, more particularly, to a work station integrated with a variety of power tools and providing a work surface including a drop-in work module for a tow able trailer, thereby permitting the work module to be towed directly to the worksite with all the power tools in place, ready to use after the hinge able compartments have been extended.

2. Discussion of the Prior Art

Tradesmen and craftsmen, such as those working in the building construction and remodeling trades require a wide variety of power tools and worktables for completing projects. When starting work on a project each day, looking for and setting up power tools and equipment for use on a job site can consume a significant amount of time. Time lost in locating tools, setting up saw horses and work surfaces is unproductive. Additionally, certain task requires items to be prepared off-site to assure because of the unsatisfactory work environment. The work module would help minimize the need to fabricate off-site.

U.S. Pat. No. 4,055,206 to Griffin discloses a composite shop trailer. The Griffin patent includes a shop type composite trailer, which can be folded to a compact size for transport and can be expanded during shop use. U.S. Pat. No. 5,383,698 to Buchholz discloses a tool trailer with open end. The Buchholz patent includes a trailer that is fitted with power saws particularly adapted to accept long pieces of lumber for sawing. U.S. Pat. No. 6,565,165 to Switkes discloses a compact ergonomic weatherproof mobile workstation. The Switkes patent includes a composite workstation with multiple compartments, which are created by joining structural panels in perpendicular, parallel and opposing horizontal configurations. Tools and supplies are placed in the compartments formed in the composite workstation.

Therefore, there remains the need in the construction and remodeling industries for a mobile work station that is designed specifically to illuminate the typical issues involved with the setup and the available work bench areas to perform the normal daily task. The work module would eliminate the need for saw horses and work benches.

SUMMARY OF DISCLOSURE

Accordingly, embodiments of the inventive disclosure made herein, which disclose a drop-in work module for a wheeled vehicle such a trailer equipped to be pulled by a wheeled vehicle such as a pickup or a van.

The drop-in work module integrates a variety of power tools and equipment used daily in the home and commercial building industries.

The work module is a basic rectangular box-like structure that has foldable side rails that pivot from a stored position to a work position, which forms a large flat work surface area.

The work module has locking pins on the side rails, which is used to lock the side rails into position for transporting. The pins also have provisions for a security lock to be attached, which will protect all the equipment that is stored in the work module.

The work module includes a tailgate that serves as a set of drop down steps that pivot to a down position and will assist the user for the access to the top work surface of the work module.

The work module includes a dustbin under the work surface that will collect the dust particles from the saws that are mounted on the work module.

The work module includes a top retractable surface that exposes a dual slide saw module.

The work module includes a miter saw that mounts on a hinge that will pivot from a stored position to a ready to use position.

The work module includes a router or drill press mounted on a hinged top that pivots from a stored position to a ready to use position.

The work module includes storage areas for equipment/hand tools that mounts on a hinge that pivot from a stored position to a ready to use position.

The work module includes a pre-wired electrical service box for 120 VAC connections for all power tools. All wiring is routed and secured to the inside surface of the work module. Receptacles are also pre-wired for other power tools that may be used in conjunction with the work module.

The circular saw module has two saws that can accommodate various blades that may be needed for the individual work task and therefore reduces the need to change between different saw blades during the project in progress.

The circular saw module has a slide assembly that includes two linear rails with composite bearings, motor driven acme screw for the laterally position of the saws.

The circular saw module has an actuator unit which positions the saws from a stored (safe) down position to the upward saw position exposed ready for use. Actuator has an on-board limit switch to prohibit the saws from staring while in the up position.

The circular saw module has a rolling deck attached to the top side of the unit. This is used to cover the slide assembly for a safe working environment.

The work module has moveable push-lock mechanisms designed to hold the part secure for the saw module. The push-lock mechanisms are mounted on a rail, which will allow the part to be secured and move the part in straight line in relation to the saws.

The work module includes an electrical control drive panel, which includes the controls for the saws and the saw slide positioning.

The work module and electrical safety hand held pendant that allows the user to operate the saw module from various positions.

The work module and electrical safety foot switch that requires the foot switch to be depressed before either saw will operate.

The work module top supports include a U-shaped channel that also serves as a water-proof channel which routes water from the top surfaces similar to that of a rain gutter system.

The work module is suggested but not limited to being constructed from aluminum type materials in order to capitalize on light weight, non-corrosive and has substantial mechanical strength properties.

BRIEF DESCRIPTION OF DRAWINGS

The drawings show a form of the invention that is presently preferred; however, the invention is not limited to the precise arrangement shown in the drawings.

DETAILED DESCRIPTION OF THE PREFERRED EMBODIMENTS

In preparation for explaining the details of the present inventive disclosure, it is to be understood by the reader that the invention is not limited to the presented details of the construction materials and embodiments and of being practiced and realized in various ways by applying the disclosure presented herein.

Figure 1:
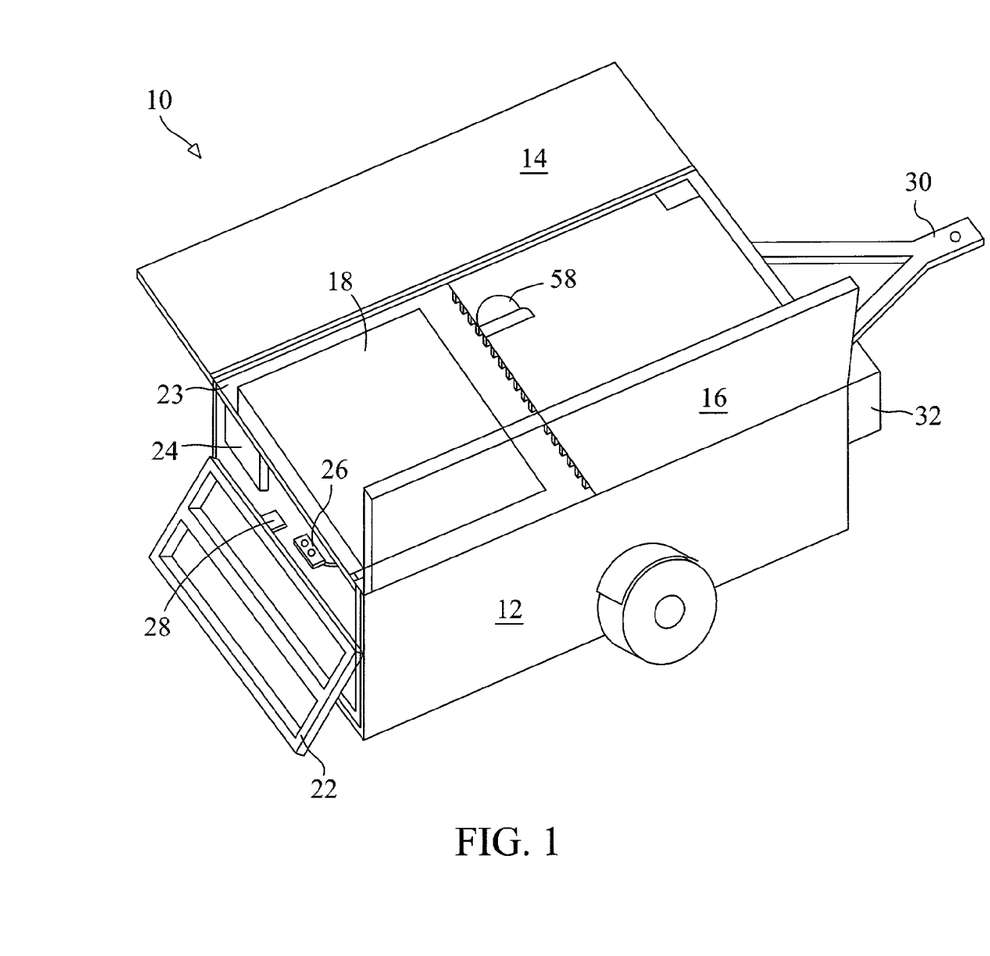
FIG. 1 presents a perspective view of a drop-in work module in accordance with the inventive disclosures herein.

FIG. 1 presents a perspective view of a drop-in work module 10 in accordance with the inventive disclosures herein. The work module 10 is depicted installed into a tow able trailer 12. Left side rail 14 and right side rail 16 is hinge ably connected to the sidewalls of the work module 10. A dustbin 18 for receiving sawdust from the saw 58 is positioned below the top surface 23 of the work module. The fold down tailgate, 22 drops and also serves as a steps to the top surface area of the work module 10. Behind the tailgate 22 is a storage compartment 38 that houses the electrical drive panel 24, the foot safety switch 28 and the pendant control 26. An electrical service box 32 is secured to the front of the work module 10, the service box provides the electrical supply connections for connecting the main power source to the pre-wired device within the work module 10.

Figure 2:
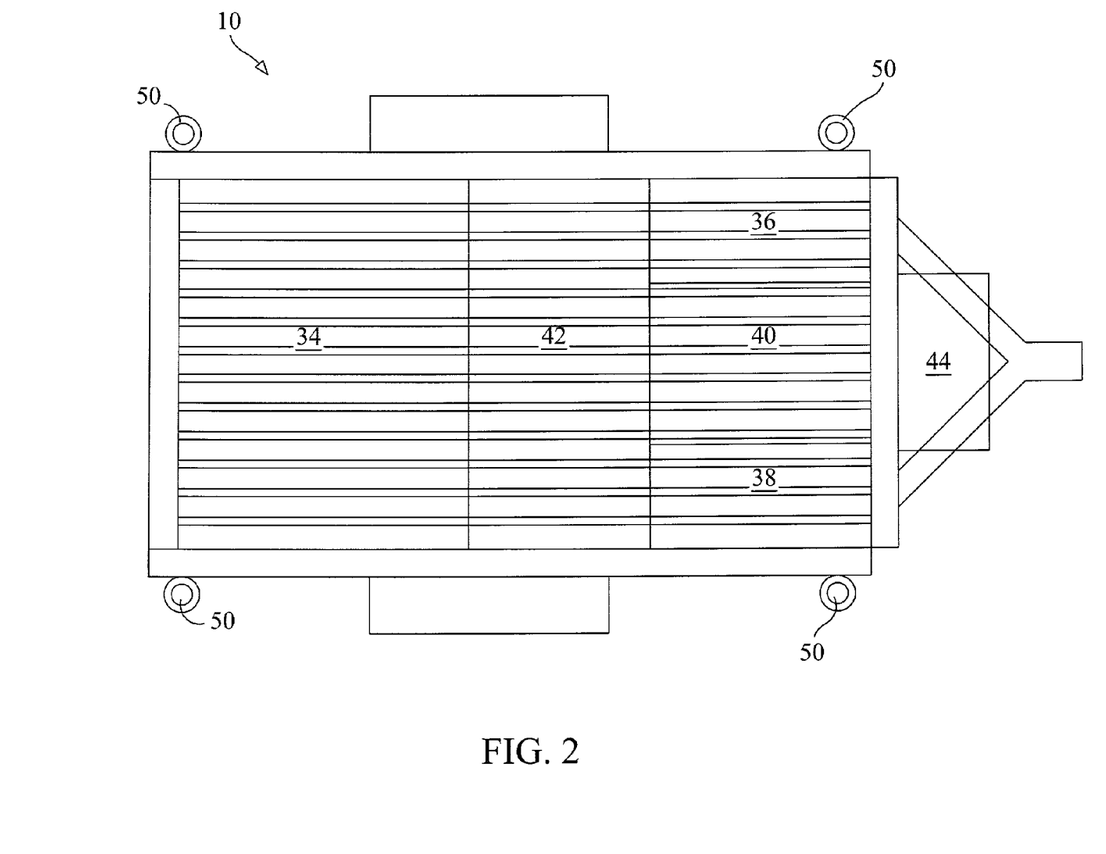
FIG. 2 presents a plan view of one embodiment of the drop-in work module depicting compartment layout and top surfaces covering the compartments, in accordance with the inventive disclosures herein.

FIG. 2 presents a plan view of one embodiment of the work module 10 depicting compartment layout and covering top surfaces in accordance with the inventive disclosures herein. The top surface 20 (see FIG. 1) includes; a dustbin top surface portion 34, a router/drill top surface portion 36, a dual saw slide top surface portion 42 and a storage compartment portion 40. The optional mounting bracket for a generator/compressor is shown a front of trailer portion 44.

Figure 3A:
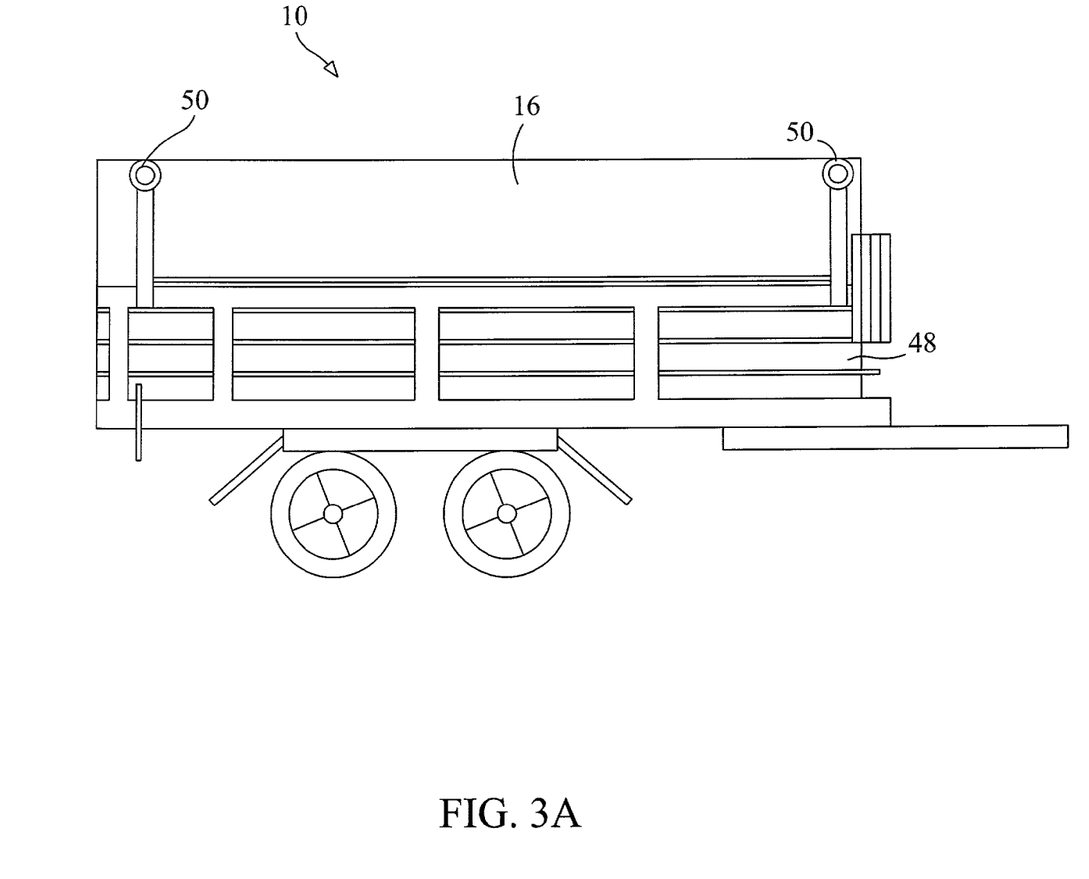
FIG. 3A illustrates a side view of one embodiment of the drop-in work module showing a folding side rail in a stored position.

FIG. 3A illustrates a side view of one of the embodiments of the drop-in work module 10 showing the right side rail 16 in a stored position substantially parallel to the right sidewall 48 of the work module 10. Locking pins 50 are operable for selectively locking the side rail 16 in the stored position.

Figure 3B:
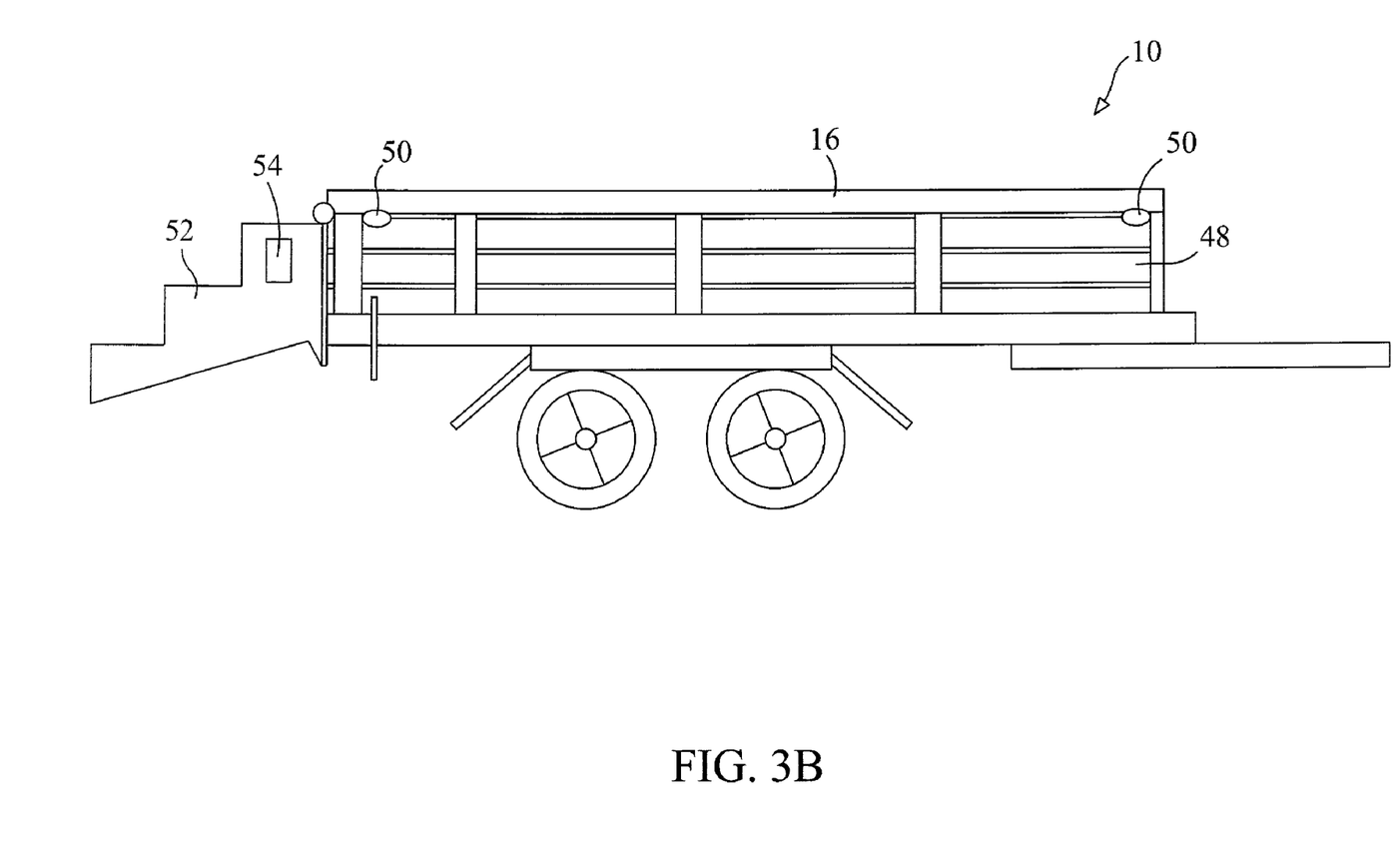
FIG. 3B illustrates a side view of one embodiment of the drop-in work module showing a folding side rail in a work position to provide flat top work surface.

FIG. 3B illustrates a side view of one embodiment of the drop-in work module depicting the right side rail 16 in an open position providing an extended work surface. Fold down tailgate/steps 52 are hinge ably secured onto the rear of the work module 10, the steps operable to a dropped down position wherein the steps provide the user access to the top work surface 20 (see FIG. 1). In the depicted embodiment, an electrical service outlet 54 is provided in the toe side of the fold down steps 52.

Figure 4:
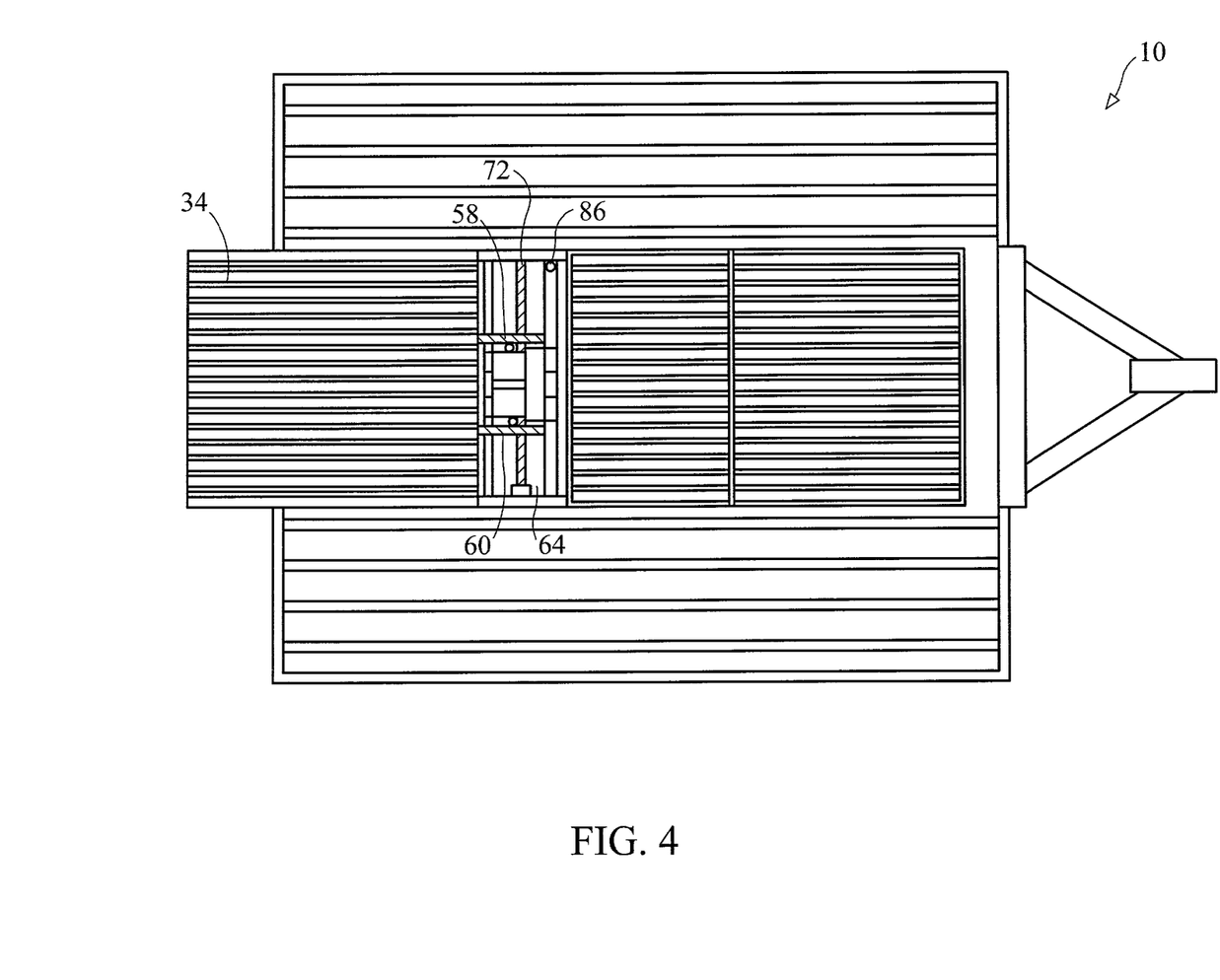
FIG. 4 illustrates a top view of one of the embodiments of the drop-in work module depicting the top work surface in the retracted positing exposing the saw slide module without the rolling deck attached.

FIG. 4 illustrates a top view of the work surface of the work module 10. The top surface portion 34 is shown in the retracted position exposing the saw slide module 64. A left saw 58 and a right saw 60 are mounted on a horizontal slide mechanism 86. The surface portion 34 is manually retracted and locks into place in preparation for the use of either saw 58 or 60.

Figure 5:
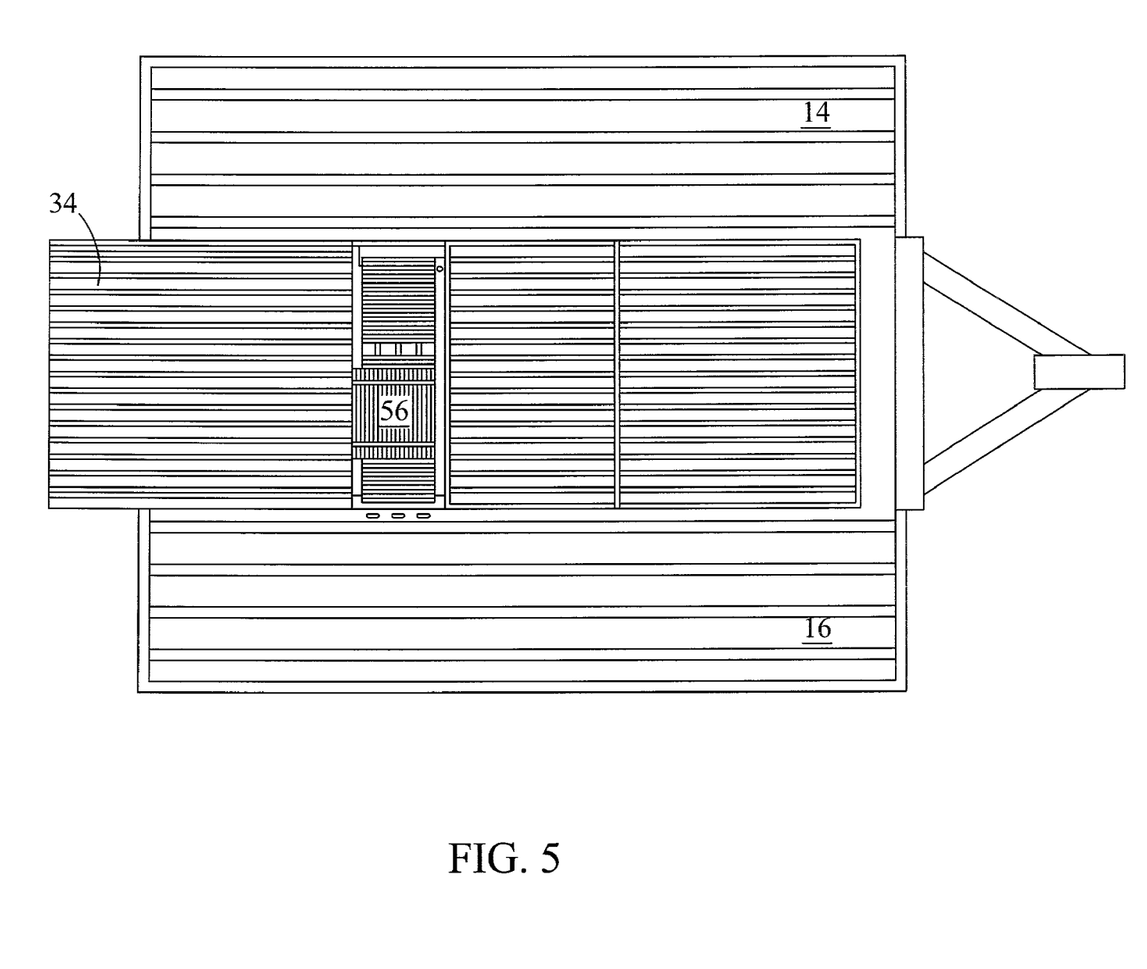
FIG. 5 illustrates a top view of one of the embodiments of the drop-in work module depicting the top work surface in the retracted positing exposing the saw slide module with the rolling deck attached.

FIG. 5 illustrates a top view of one embodiment of the work module 10 depicting the rolling deck surface 56 which covers the saw horizontal slide mechanism 64 (see FIG. 4). The rolling deck 56 moves horizontally with the saw slide module 64 (see FIG. 9) and is a cover that protects the saw module from debris and serves as a protective device for the user by reducing the area for pinch points. FIG. 5 also illustrates the side rails 14 and 16 in the down work position.

Figure 6:
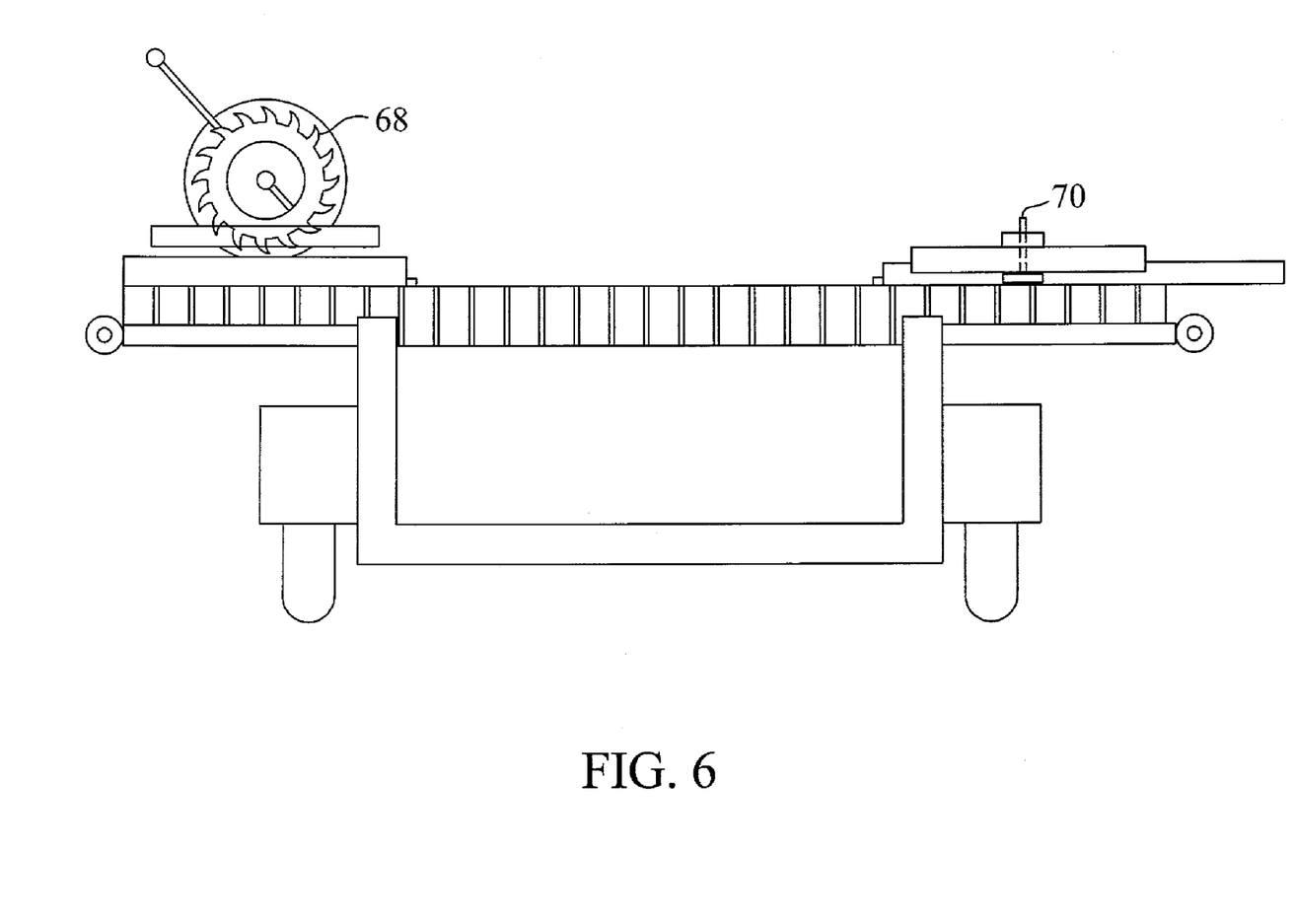
FIG. 6 illustrates front view of one of the embodiments depicting the miter saw and bench router swung out in the open position for use.

FIG. 6 illustrates a rear view of the work module 10 depicting the miter saw 68 and bench router 70 in the swung out position ready for use. The left side rail and the right side rail are shown in the full open-down position creating a flat work surface.

Figure 7:
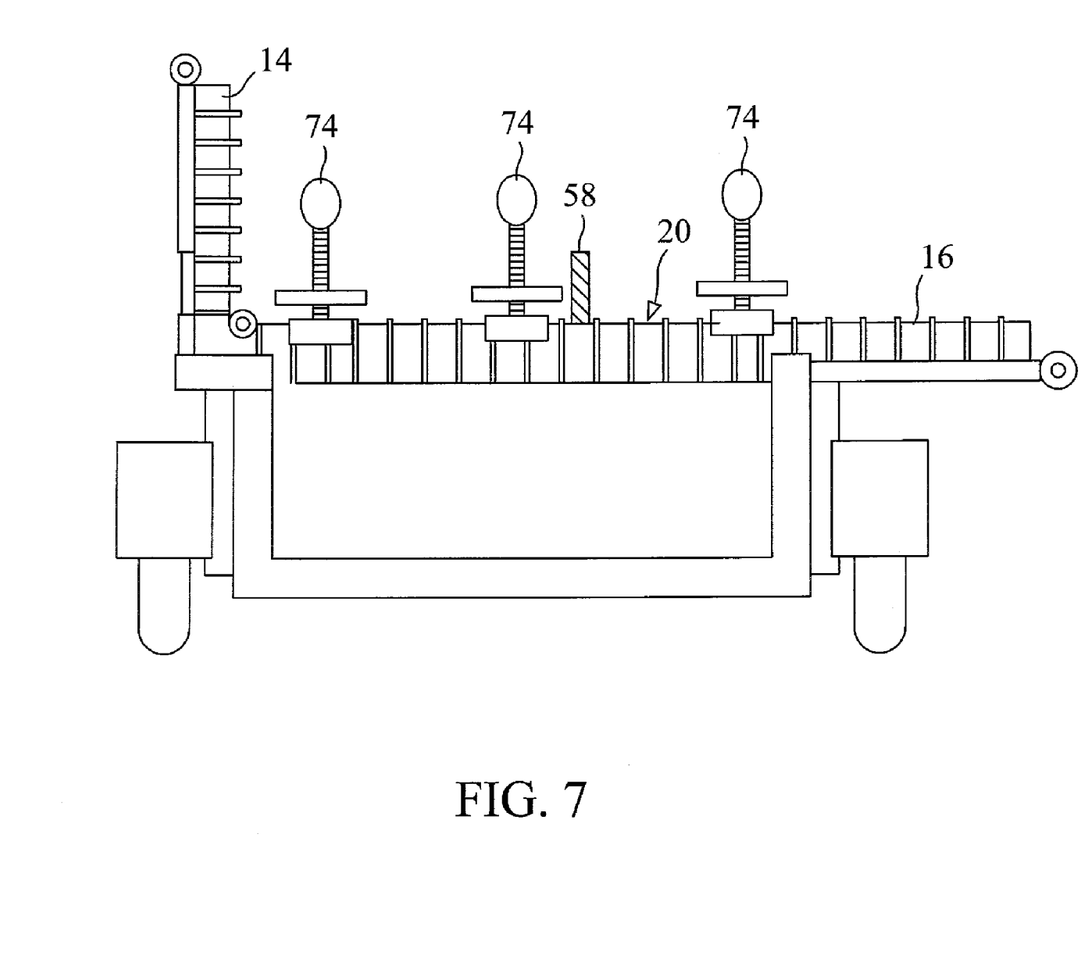
FIG. 7 illustrates rear view of one of the embodiments depicting the left side rail raised to the stored position to be used as a fence to guide materials being cut with saw.

FIG. 7 illustrates a rear view of the work module 10 depicting the left side rail 14 raised to the stored position and serving as a fence so as to be operable to guide material being cut by the left saw 58 in order to provide a precise cut. The feed screw 72 (see FIG. 4) is operable for positioning the saw 58 to a selected distance from the fence side rail 14 for performing the desired cut on the material being cut. Moveable push-locking mechanisms 74 are screwed down to secure the part being cut and will enable the user to guide the material through the saw without the risk of getting the users hands close to the saw blades. The push-lock mechanisms 74 also keep the part from being kicked back into the face of the user.

Figure 8:
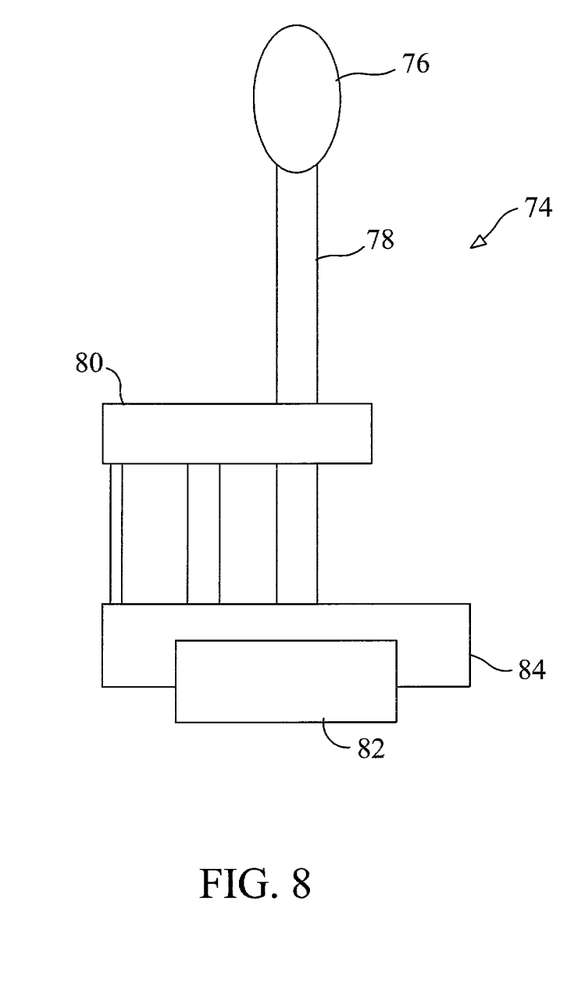
FIG. 8 illustrates a plan view of a moveable push-lock mechanism designed to secure part while it is being pushed onto the saw blade.

FIG. 8 illustrates the components within the pushlock mechanism 74. The push-lock handle 76 is secured to one end of an adjustment screw 78. The middle portion of the adjustment screw 78 is affixed to a threaded block 80 which travels up/down in accordance to the turning of the screw 78. The bottom portion of the adjustment screw 78 is affixed to a bearing block 84, which allows the adjustment screw 78 to turn freely and yet stayed secured to the block 84. Block 84 also serves as linear bearing, which contains a composite surface on the bottom surface of the block 84 and allows the block to be secured but move laterally in conjunction with the rail 82 which is permanently attached to the work module top surface (see FIG. 7).

Figure 9:
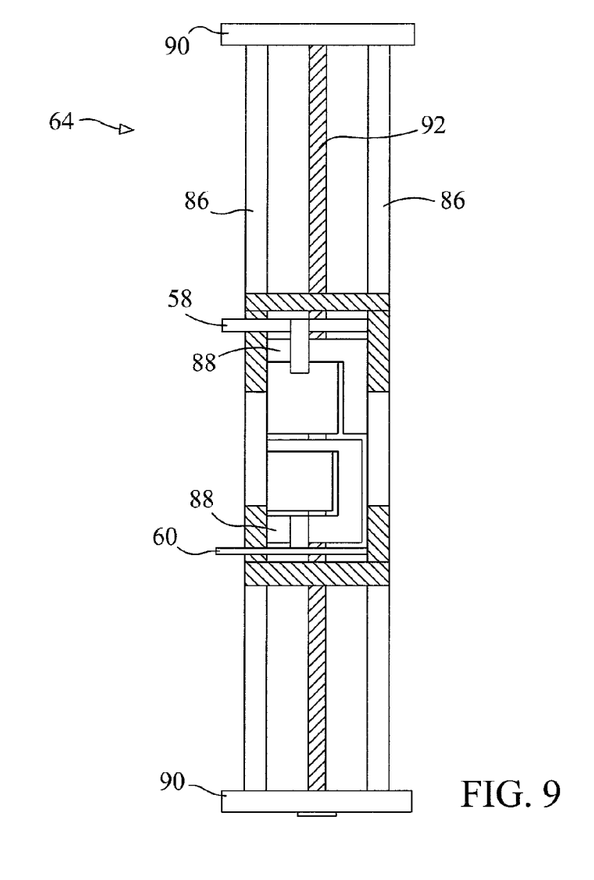
FIG. 9 illustrates a plan view of the saw slide module, which includes left/right circular saws, motor driven acme screw, saw bearing rails and the end supports.

FIG. 9 illustrates a plan view of the saw slide mechanism 64 depicted without the rolling deck 56 (see FIG. 5). The saw slide mechanism includes; two elongated slide rods 86 positioned in a spaced parallel arrangement. Two saws 58 and 60 are attached to a base plate 88. The base plate 88 contains four composite bearings (not shown) on all four corners of the base plate, which allow the saws to move horizontally on the slide rods 86. Two pillow blocks 90 are provided to secure the ends of the guide rods 86 and the feed screw 92. The feed screw 92 is Rota ably received into the pillow blocks 90. The feed screw 92 extends between the pillow blocks with the feed screw thread ably engaging the saw base plate 88 whereby the saws are laterally positioned by the turning of the feed screw 92. In a preferred embodiment the slide rods 86 are 1.5 inch in diameter and are chrome plated or stainless steel. The screw 92 is a 1.0 inch diameter and is a stainless steel screw with a 0.025 per/inch pitch threads.

Figure 10:
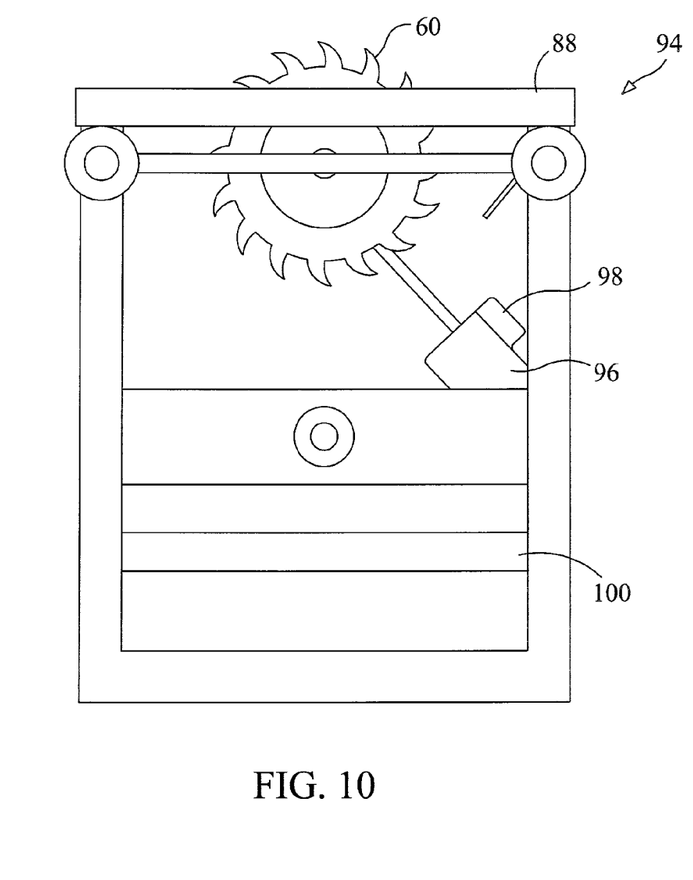
FIG. 10 illustrates a side view of the saw slide module, which includes a right circular saw, the extend/retract actuator for the right circular saw.

FIG. 10 illustrates a side view of the dual slide module 94 with the right saw 60 in the raised ready for use position. This view of the saw slide module depicts a stepper actuator 96 operable for selectively vertical positioning of the saw 60 between a first lowered (stored) positions and a second raised ready for use position. The stepper actuator is provided with a limit switch 98 for sensing when the saw is in the retracted position. The guide roll 100 is a guide roller for the roller deck 66 (see FIG. 5) and provides a movable surface for the roller deck to roll upon. FIG. 10 does not depict the saw 58, which has duplicate components (stepper actuator/actuator limit switch/guide roller) and is a mirror image of this illustration FIG. 10.

Figure 11:
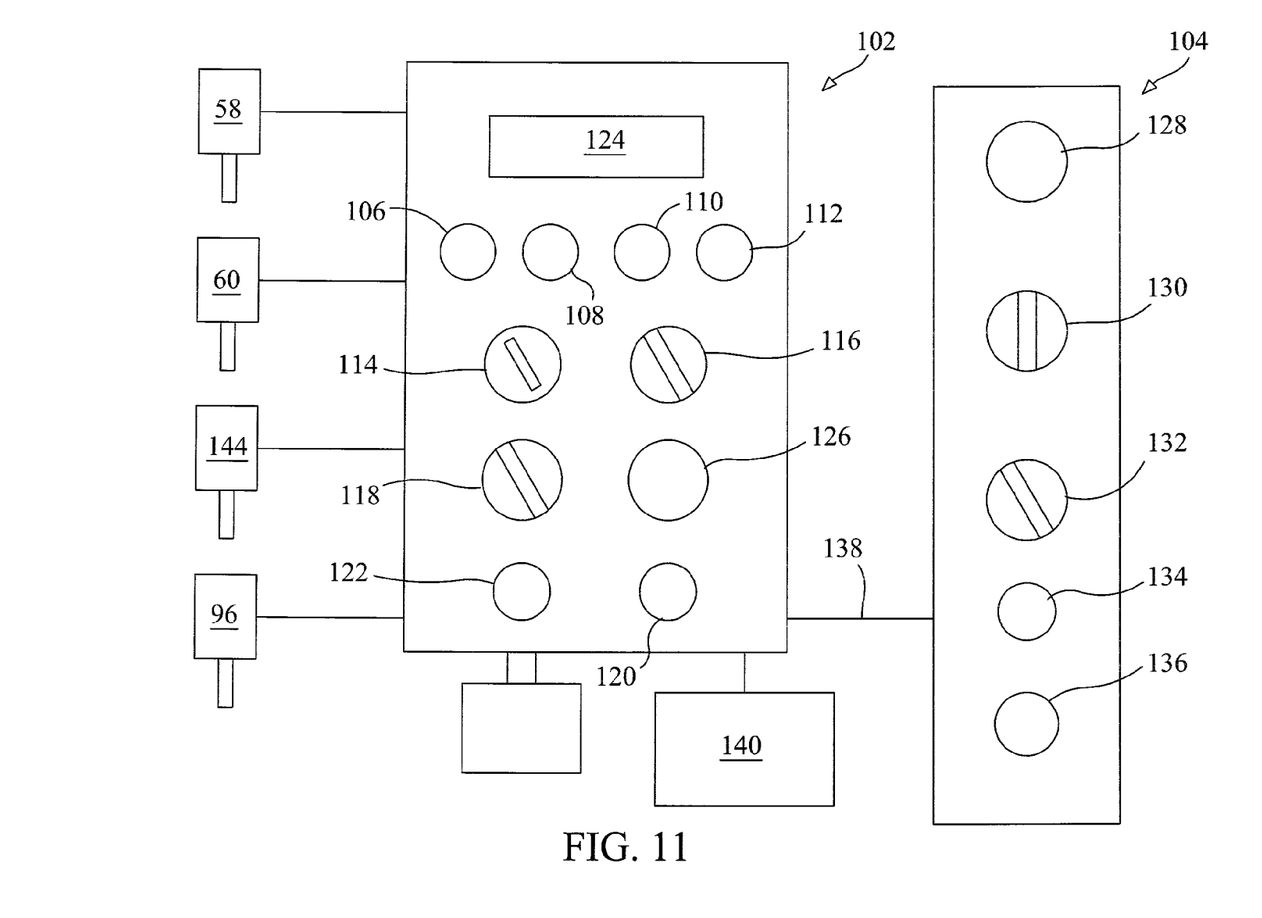
FIG. 11 depicts the electrical controls system, which includes the control drive panel, pendant controls and the safety foot switch.

FIG. 11 illustrates the electrical controls for the saw slide module components. Inside (not shown) the drive panel 102 contains the drive for the stepper screw motor, solid state relays for the saw motors and a micro-logic controller that controls all the components which includes the safety interlocks needed to operate the saw module safely. The front face of the drive panel 102 includes; a main power LED indicating light 108, a table top limit LED indicating light 110, a saw retract limit LED indicating light 110, a foot switch LED indicating light 112, a main power on/off key switch 114, a saw enable/disable selector switch 116, a saw extend toggle switch 118, a fast feed toggle switch 120 for selectively commanding the saws into the cut position, a slow feed toggle switch 122 for selectively commanding the saws into the cut position for small incremental moves of the saws, digital display 124 shows the position of the saw by displaying the current position in inches, the zeroing pushbutton 126 is fro re-zeroing the digital display to 0.00" and can be implemented at any position of the saw slide.

FIG. 11 also depicts the ANSI approved hand held control pendant 104 which includes; a maintained emergency stop button 128 to disable all saw motion controls, a saw enable/disable selector switch 130 which disables the saw operation and must be used when positioning the saws in there extended position and therefore prohibit the accidental starting of the saws while trying to measure and position saws for use. The hand held pendant 104 also includes a saw extend selector switch 132 which raises the saws into there saw position and allows the user to properly align the saw slide module with the screw feed positioning with the use of fast feed toggle switch 134 or the slow feed toggle switch 136 which operates the feed screw to the desired position for the cut. The hand held pendant is electrically connected via a SOOW type pendant cable 138.

FIG. 11 further depicts a saw start foot-switch 140 which is interfaced to the controls and prohibits the operation of the saws unless the switch is depressed.

This patent application was submitted with the concept of an optimum work module for the major contractor but this invention should be introduced as an optional package that can be an attractive incentive for even the casual user by selecting a model in accordance to their needs. This package could be offered with different variations of the pre-described components; saw slide module, saw dust bin, miter saw, router/drill, push-lock mechanism and the pre-wired module.

All illustrations and descriptions have been made to the accompanying drawings that form a part hereof, and in which are shown by the way of illustration specific embodiments in which the invention may be practiced. These embodiments and certain variants thereof have been described in sufficient detail to enable those skilled in the art to practice the invention. It is to be understood that other suitable embodiments may be utilized and that logical, material and mechanical changes may be made without departing from the spirit or scope of the invention. To avoid unnecessary detail, the description is, therefore, not intended to cover such alternatives.

What is claimed is:

1. A drop-in work module for a trailer, comprising:
   a left side wall;
   a right side wall;
   a top surface being positioned on top of said left and right side walls, said top surface having a length that is greater than a width thereof, said top surface having a lengthwise axis, said top surface having a left end and a right end, said width is defined by a distance from said left end to said right end, said left end is located adjacent said left side wall, said right end is located adjacent said right side wall;
   at least one side rail being pivotally retained adjacent said left end or said right end of said top surface, a top of said at least one side rail being substantially flush with a top of said top surface when in a support position, said at least one side rail being pivoted upward to a substantially vertical orientation to act as a guide for material to be cut, said at least one side rail extending substantially a length of said top surface;
   at least one cutting tool is positioned between said left end and said right end below said top surface, said at least one cutting tool provides a cut which is substantially parallel to said lengthwise axis; and
   means for moving said at least one cutting tool closer to either said left end or said right end of said top surface.

2. The drop-in work module for a trailer of claim 1, further comprising:
   a sawdust bin being located below said top surface.

3. The drop-in work module for a trailer of claim 1, further comprising:
   said means for changing a distance including at least one carriage, two slide rods, a feed screw and a motor, said at least one carriage being slidably engaged with said two slide rods, said carriage being moved by the rotation of said feed screw, said feed screw being rotated by said motor.

4. The drop-in work module for a trailer of claim 3 wherein:
   each one of said at least one cutting tool being a circle saw.

5. The drop-in work module for a trailer of claim 4, further comprising:
   an actuator for moving said circle saw above and below said top surface.

6. The drop-in work module for a trailer of claim 1, further comprising:
   at least one push lock grip being retained in said top surface, each one of said at least one push lock grip being secured to a part to push the part past said at least one cutting tool.

7. The drop-in work module for a trailer of claim 1, further comprising:
   a second cutting tool being mounted to at least one of said at least one side rail.

8. A drop-in work module for a trailer, comprising:
   a left side wall;

a right side wall;

a top surface being positioned on top of said left and right side walls, said top surface having a length that is greater than a width thereof, said top surface having a lengthwise axis, said top surface having a left end and a right end, said width is defined by a distance from said left end to said right end, said left end is located adjacent said left side wall, said right end is located adjacent said right side wall;

at least one side rail being pivotally retained adjacent said left end or said right end of said top surface, a top of said at least one side rail being substantially flush with a top of said top surface when in a support position, said at least one side rail being pivoted upward to a substantially vertical orientation to act as a guide for material to be cut, said at least one side rail extending substantially a length of said top surface;

at least one circle saw is positioned between said left end and said right end below said top surface, said at least one circle saw provides a cut which is substantially parallel to said lengthwise axis; and a tool slide for moving said at least one circle saw closer to either said left end or said right end of said top surface.

9. The drop-in work module for a trailer of claim 8, further comprising:

a sawdust bin being located below said top surface.

10. The drop-in work module for a trailer of claim 8, further comprising:

said tool slide including at least one carriage, two slide rods, a feed screw and a motor, said at least one carriage being slidably engaged with said two slide rods, said carriage being moved by the rotation of said feed screw, said feed screw being rotated by said motor.

11. The drop-in work module for a trailer of claim 8, further comprising:

an actuator for moving said at least one circle saw above and below said top surface.

12. The drop-in work module for a trailer of claim 8, further comprising:

at least one push lock grip being retained in said top surface, each one of said at least one push lock grip being secured to a part to push the part past said at least one cutting tool.

13. The drop-in work module for a trailer of claim 8, further comprising:

a second cutting tool being mounted to at least one of said at least one side rail.

14. A drop-in work module for a trailer, comprising:

a left side wall;

a right side wall;

a top surface being positioned on top of said left and right side walls, said top surface having a length that is greater than a width thereof, said top surface having a lengthwise axis, said top surface having a left end and a right end, said width is defined by a distance from said left end to said right end, said left end is located adjacent said left side wall, said right end is located adjacent said right side wall;

a left side rail being pivotally retained adjacent said left end, a top of said left side rail is substantially flush with a top of said top surface in a support position, said left side rail being pivoted upward to a substantially vertical orientation to act as a guide for material to be cut, said at least one side rail extending substantially a length of said top surface;

a right side rail being pivotally retained adjacent said right end, a top of said right side rail is substantially flush with a top of said top surface in a support position, said right side rail being pivoted upward to a substantially vertical orientation to act as a guide for the material to be cut, said at least one side rail extending substantially a length of said top surface;

at least one circle saw is positioned between said left end and said right end below said top surface, said at least one circle saw cuts substantially parallel to said lengthwise axis; and a tool slide for moving said at least one circle saw closer to either said left end or said right end of said top surface.

15. The drop-in work module for a trailer of claim 14, further comprising:

a sawdust bin being located below said top surface.

16. The drop-in work module for a trailer of claim 14, further comprising:

said tool slide including at least one carriage, two slide rods, a feed screw and a motor, said at least one carriage being slidably engaged with said two slide rods, said carriage being moved by the rotation of said feed screw, said feed screw being rotated by said motor.

17. The drop-in work module for a trailer of claim 14, further comprising:

two actuators for moving said at least one circle saw above and below said top surface.

18. The drop-in work module for a trailer of claim 14, further comprising:

at least one push lock grip being retained in said top surface, each one of said at least one push lock grip being secured to a part to push the part past said at least one circle saw.

19. The drop-in work module for a trailer of claim 14, further comprising:

a cutting tool being mounted to at least one of said left and right side rails.

* * * * *